United States Patent
Stopczynski (10) Patent No.: US 6,950,733 B2
(45) Date of Patent: Sep. 27, 2005

(54) METHOD OF CONTROLLING AN EXTERNAL OBJECT SENSOR FOR AN AUTOMOTIVE VEHICLE

(75) Inventor: Lawrence Gerard Stopczynski, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 31 days.

(21) Appl. No.: 10/635,893

(22) Filed: Aug. 6, 2003

(65) Prior Publication Data

US 2005/0033497 A1 Feb. 10, 2005

(51) Int. Cl.$^7$ .............................................. G06F 17/00
(52) U.S. Cl. ..................................................... 701/45
(58) Field of Search ............................ 701/36, 45, 47, 701/93, 96, 223, 225, 301–302; 342/70, 72, 104, 107, 109; 340/903–904, 992

(56) References Cited

U.S. PATENT DOCUMENTS

| | | | |
|---|---|---|---|
| 4,500,977 A | 2/1985 | Gelhard | |
| 4,528,563 A | 7/1985 | Takeuchi | |
| 4,626,850 A | 12/1986 | Chey | |
| 5,173,881 A | 12/1992 | Sindle | |
| 5,235,316 A | 8/1993 | Qualizza | |
| 5,249,157 A | 9/1993 | Taylor | |
| 5,314,037 A | 5/1994 | Shaw et al. | |
| 5,339,075 A | 8/1994 | Abst et al. | |
| 5,528,217 A | 6/1996 | Adams | |
| 5,529,138 A | 6/1996 | Shaw et al. | |
| 5,670,935 A | 9/1997 | Schofield et al. | |
| 5,684,474 A | 11/1997 | Gilon et al. | |
| 5,940,011 A | 8/1999 | Agravante et al. | |
| 5,979,586 A | 11/1999 | Farmer et al. | |
| 6,185,499 B1 | 2/2001 | Kinoshita et al. | |
| 6,211,778 B1 | 4/2001 | Reeves | |
| 6,226,389 B1 | 5/2001 | Lemelson et al. | |
| 6,233,515 B1 | 5/2001 | Engelman et al. | |
| 6,265,990 B1 | 7/2001 | Isogai et al. | |
| 6,268,803 B1 | 7/2001 | Gunderson et al. | |
| 6,275,773 B1 | 8/2001 | Lemelson et al. | |
| 6,278,360 B1 | 8/2001 | Yanagi | |
| 6,301,542 B1 | 10/2001 | Kirchberger et al. | |
| 6,339,369 B1 | 1/2002 | Paranjpe | |
| 6,452,535 B1 | 9/2002 | Rao et al. | |
| 6,487,500 B2 | 11/2002 | Lemelson et al. | |
| 2001/0003810 A1 | 6/2001 | Shinmura et al. | |
| 2002/0030591 A1 | 3/2002 | Paranjpe | |
| 2002/0067287 A1 | 6/2002 | Delcheccolo et al. | |
| 2002/0072843 A1 | 6/2002 | Russell et al. | |
| 2002/0091479 A1 | 7/2002 | Maruko et al. | |
| 2002/0169537 A1 * | 11/2002 | Regensburger et al. | 701/96 |
| 2003/0167113 A1 * | 9/2003 | Weilkes et al. | 701/45 |

* cited by examiner

Primary Examiner—Thu V. Nguyen
(74) Attorney, Agent, or Firm—Frank MacKenzie; Troutman Sanders LLP (57) ABSTRACT

The present invention comprises a method of external object sensing for an automobile. The method comprises the steps of establishing a vehicle operational criteria for initiating a vehicle operational safety feature, determining a sensor beam coverage area for the vehicle operational criteria or the vehicle operational safety feature, receiving a status parameter representing the operational status of the vehicle and activating the sensor for scanning the sensor beam coverage area when the status parameter meets the vehicle operational criteria.

19 Claims, 6 Drawing Sheets

*Shared Sensor Modes*

When Gear = Park
- Front PreCrash(Auto) + Side Slow PreCrash(Auto)

When Speed = Stopped, and Gear = Neutral or Forward
- Front PreCrash(Auto) + Side Slow PreCrash(Auto) + Front Parking Aid(Auto)
- Front PreCrash(Auto) + Side Slow PreCrash(Auto) + Front Parking Aid(Auto) + ACC Stop&Go (Comm)

When Speed = Stopped, and Gear = Reverse
- Front PreCrash(Auto) + Side Slow PreCrash(Auto) + Front Parking Aid(Auto)

When Speed = Low Speed, and Gear = Neutral or Forward
- Front PreCrash(Auto) + Side Slow PreCrash(Auto) + Front Parking Aid(Auto)
- Front PreCrash(Auto) + Side Slow PreCrash(Auto) + Front Parking Aid(Auto) + ACC Stop&Go (Comm)

When Speed = Low Speed, and Gear = Reverse
- Front PreCrash(Auto) + Side Slow PreCrash(Auto) + Front Parking Aid(Auto)

When Speed = Medium Speed
- Front PreCrash (Auto) + Side Fast PreCrash (Auto)
- Front PreCrash (Auto) + Side Fast PreCrash (Auto) + ACC (Comm)
- Front PreCrash (Auto) + Side Fast PreCrash (Auto) + ACC Stop&Go (Comm)
- Front PreCrash (Auto) + Side Fast PreCrash (Auto) + ACC (Comm) + ACC Stop&Go (Comm)

When Speed = High Speed
- Front PreCrash (Auto) + Side Fast PreCrash (Auto)
- Front PreCrash (Auto) + Side Fast PreCrash (Auto) + ACC (Comm)

Auto = Automatic ( Feature operates if criteria are met )
Comm = Commanded ( Feature operates if criteria are met and operator has commanded )

FIG. 5

METHOD OF CONTROLLING AN EXTERNAL OBJECT SENSOR FOR AN AUTOMOTIVE VEHICLE

FIELD OF THE INVENTION

The present invention relates, generally, to the field of external object sensing and, more specifically, to methods for external object sensing for automotive vehicular applications.

BACKGROUND OF THE INVENTION

In recent years, advanced external object sensing for automotive vehicles has become increasingly important as many cars and trucks have been adapted to include various comfort, convenience and vehicle "operational safety" features. Generally, vehicle operational safety features include collision warning/mitigation, pre-crash braking, adaptive cruise control, pedestrian detection and parking assistance applications. In addition, these features may include vehicle-to-vehicle two-way telemetry and reversible collision avoidance applications. For many vehicle operational safety features, it is necessary to establish wide-angle sensor coverage areas. Wide-angle sensor coverage can be generally defined as up to a 180 degree beam coverage area, which for a front mounted automotive sensor would include complete front sensor coverage and partial side sensor coverage. For a dual sensor array, wide-angle sensor coverage can be generally defined as up to a 270 degree beam coverage area, which for corner mounted automotive sensors would include complete front and side sensor coverage. In general, active vehicle operational safety features for collision avoidance require front sensor beam coverage. Passive vehicle operational safety features generally require front sensor beam coverage and some degree of side sensor beam coverage.

Typically, a designated sensor is utilized for scanning a designated scan area such as frontal only, side only and rear only. U.S. Pat. No. 5,235,316, discloses such a typical sensor system. The '316 patent discloses a mechanically rotating vehicle sensor for frontal or side scanning which may detect the presence of an object and calculate the distance between the object and the sensor's host vehicle to alert the vehicle operator of a possible collision threat. While the sensor is able to rotate and scan for objects in frontal and side scanning areas, it cannot scan frontal and side areas simultaneously. Further, the invention, while suitable for its intended purpose, merely discloses a system for warning a vehicle operator of a possible hazard. The sensor is not utilized for activating vehicle operational safety features.

It is currently desirable to have the capability to control an automotive vehicle sensor for both front and side vehicle operational safety feature requirements. In particular, there is a need in the art for a single sensor positioned along the front longitudinal axis of an automotive vehicle with front-looking and side-looking sensor functionality. An ideal single sensor for front-looking and side-looking functionality would generally have up to a 180 degree sensor beam coverage area.

There is also a need in the art for a dual sensor system positioned at the corners of the front longitudinal axis of an automotive vehicle with complete front-looking and side-looking sensor functionality. An ideal dual sensor system for front-looking and side-looking functionality would generally have up to a 270 degree sensor beam coverage area.

There is also a need in the art for a method of controlling multiple sensor beams for scanning particular scan regions depending on unique criteria for each vehicle operational safety feature supported by an automotive vehicle sensor. Also, there is a need in the art for a method for controlling a sensor for scanning particular scan regions for multiple vehicle operational safety features on a feature-dependent, time-interleaved basis. Time-interleaved sensor scanning may be determined based on vehicle operating conditions and vehicle operational safety feature criteria.

Finally, there is a need in the art for a method of controlling a sensor for an automotive vehicle for simultaneously detecting front and side region objects and for activating active and passive vehicle operational safety features in response to an object detection.

SUMMARY OF THE INVENTION

Briefly described, the present invention comprises a method including associated apparatuses and systems, for external object sensing for automotive vehicular applications.

The present invention provides a method of controlling a sensor in an automotive vehicle. In one embodiment, the method comprises the steps of establishing a vehicle operational criteria associated with a vehicle operational safety feature and determining a sensor beam coverage area for the vehicle operational criteria or the vehicle operational safety feature. A status parameter representing the operational status of the vehicle is received and the sensor is activated for scanning the desired sensor beam coverage area when the status parameter meets the vehicle operational criteria.

Other advantages of the present invention will become apparent upon reading and understanding the present specification when taken in conjunction with the appended drawings.

BRIEF DESCRIPTION OF DRAWINGS

The invention will be more readily understood from a reading of the following specifications and by reference to the accompanying drawings forming a part thereof, wherein an example of the invention is shown and wherein.

The construction designed to carry out the invention will hereinafter be described, together with other features thereof.

DETAILED DESCRIPTION OF THE PREFERRED EMBODIMENTS

Figure 1A:
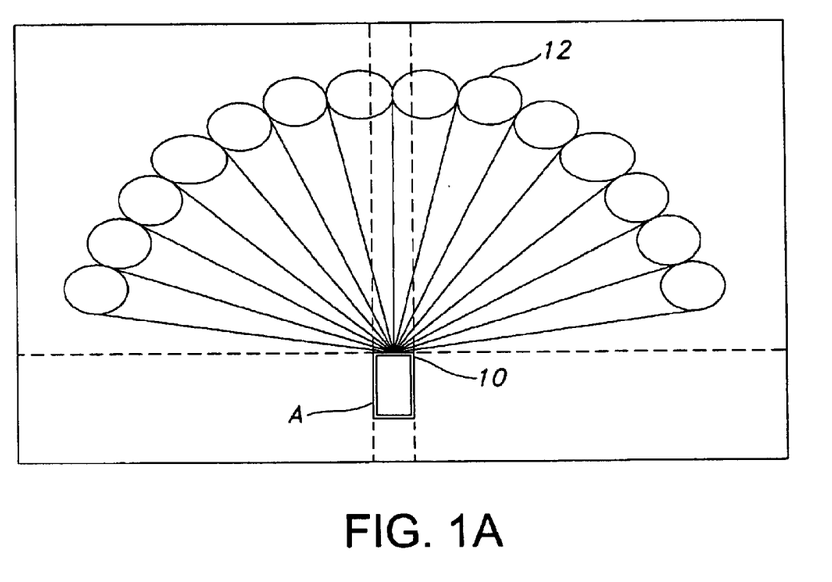
FIG. 1A illustrates a single sensor coverage field-of-view according to embodiments of the present invention.

Referring now to FIG. 1A, the present invention comprises a method for external object sensing for automotive vehicular applications. In one embodiment, the present invention comprises a single, multi-function, all-weather sensor 10 for an automotive vehicle A. In general, the automotive vehicle A has a main body and a first protrusion defining a front bumper region which generally extends forward from the main body of the vehicle (not shown). The automotive vehicle A may also include a second protrusion defining a rear bumper region which generally extends rearward from the main body of the vehicle (not shown). The sensor 10 is preferably attached along the front bumper region of the automotive vehicle A, but may also be attached along the rear bumper region or on the main body of the automotive vehicle A.

The sensor 10 is capable of supporting vehicle operational criteria and vehicle operational safety features that require varying degrees of object detection, as will be described in further detail below. For object detection, the sensor 10 has a predetermined coverage "field-of-view" or sensor coverage area 12. The sensor coverage area 12 is a composite of multiple sensor beams arraying outward in a generally symmetrical, fan-like pattern from an origination point. Sensors which are suitable for the purposes of the present invention may include radar, lidar and vision based sensors, including active and passive infrared sensors.

In one embodiment of the present invention, the sensor 10 has a sensor coverage area 12 for full front-looking functionality and partial side-looking functionality. Preferably, the sensor beam coverage area should be 180 degrees from an origination point. A front-looking coverage area can be generally defined as the area between two longitudinal axes running along the side periphery of the automotive vehicle and forward of a horizontal axis running along the front periphery of the vehicle. A partial side-looking coverage area can be generally defined as the area forward of the horizontal axis running along the front periphery of the vehicle and outside of the predefined two longitudinal axes.

Figure 1B:
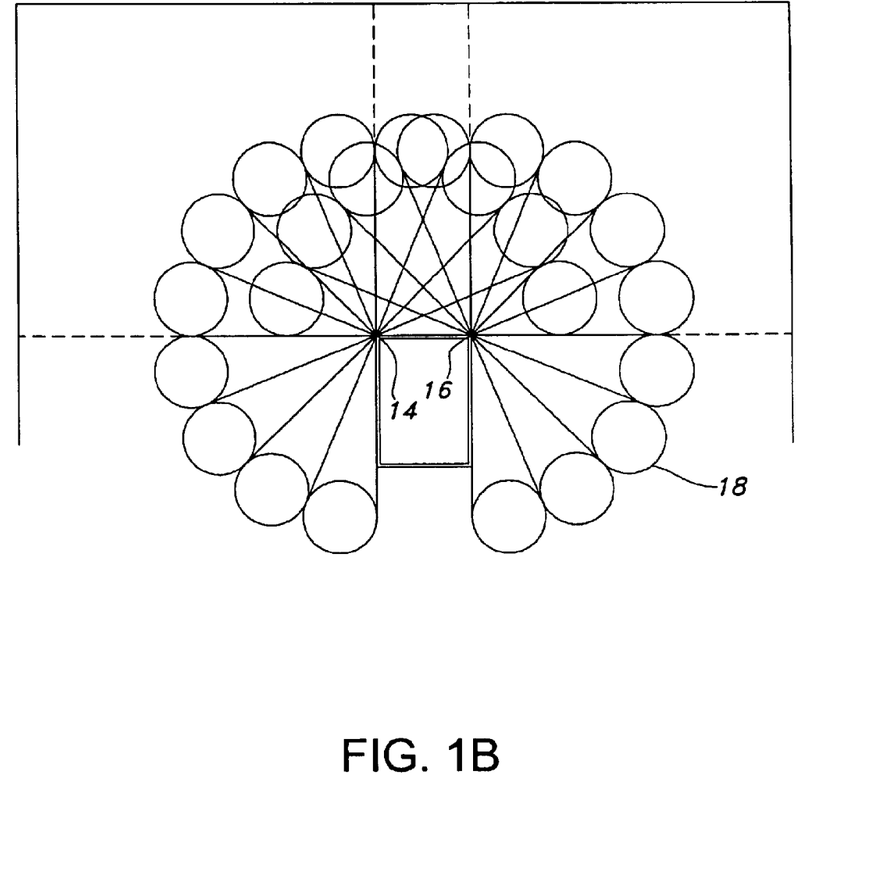
FIG. 1B illustrates a dual sensor coverage field-of-view according to embodiments of the present invention.

In an alternative preferred embodiment, the present invention comprises dual sensors consistent with the types of sensors described above. FIG. 1B illustrates a typical dual sensor coverage field of view for supporting the various vehicle operational safety features of the present invention. The dual sensors, 14 and 16 respectively, have a sensor coverage area 18 for full front-looking and full side-looking functionality and are generally attached at the corners, or "headlamp areas", of the front bumper region of the automotive vehicle A. Preferably, the sensor coverage area 18 should be 270 degrees from two origination points.

Figure 2A:
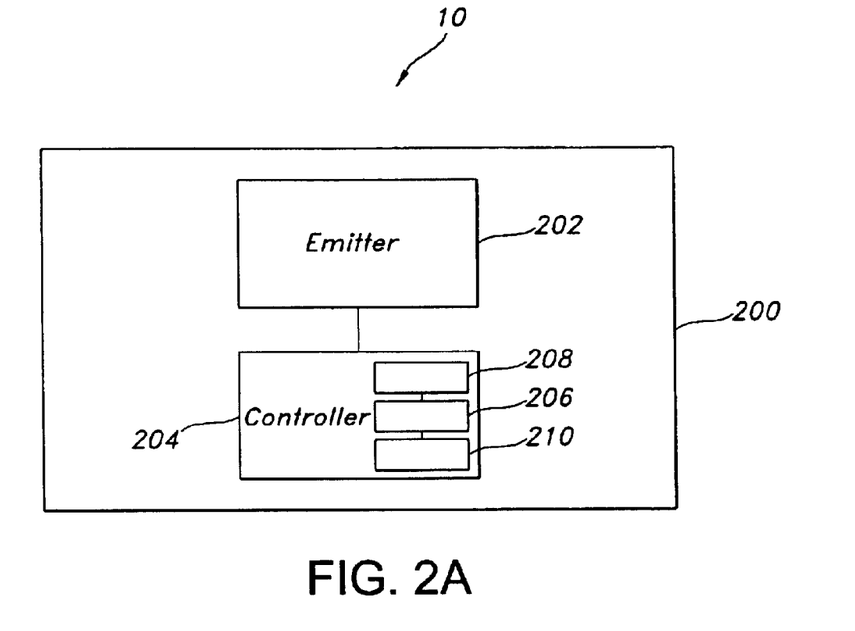
FIG. 2A illustrates a sensor according to embodiments of the present invention.

The sensor 10 comprises a housing 200 as illustrated in FIG. 2A. The housing 200 may consist of a material suitable for protection from weather and other environmental conditions including projectiles, gravel and other debris and/or should be packaged within or behind other protective components of the vehicle. The housing will allow transmission and/or reception of signal energy for the purposes of detecting objects. The housing 200 encloses an emitter 202 and a controller 204 that is electronically communicative with the emitter 202. It will be recognized by those skilled in the art that the controller 204 may be in a separate housing from the emitter 202.

The controller 204 is an electronic circuit for controlling the operation of the emitter 202. The controller 204 preferably comprises a microprocessor component 206 that is electronically coupled to memory 208 and timer 210 components that may be separate components or integrated into the microprocessor component 206. The memory component 208 may comprise various types of memory including read only memory, random access memory, electronically erasable programmable read only memory, and keep alive memory. The timer component 210 may be a clock timer for the microprocessor component. The timer component 210 is capable of timing the duration of various events as well as counting up or counting down.

Figure 2B:
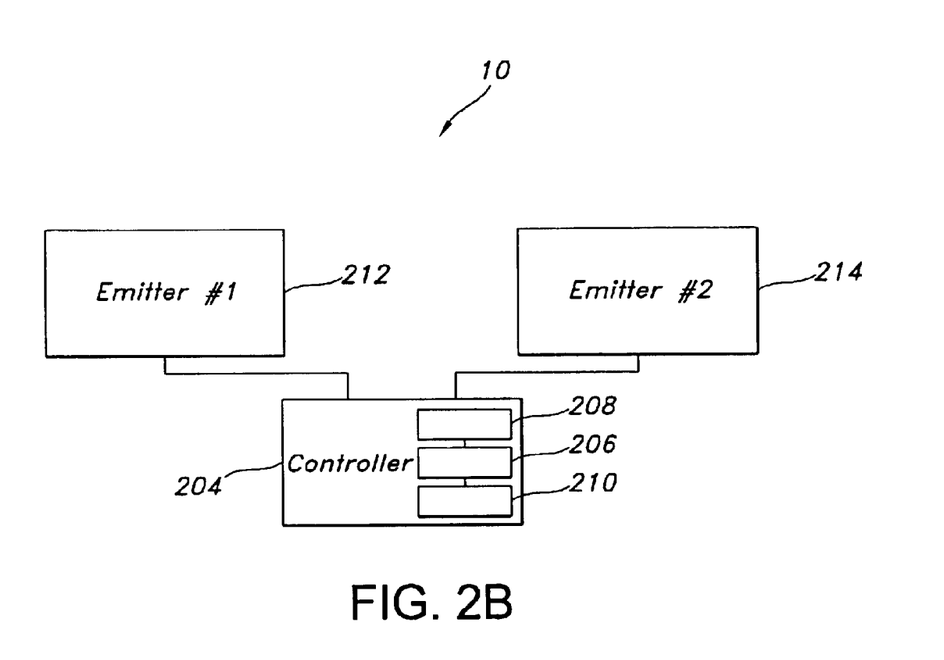
FIG. 2B illustrates a dual sensor system according to embodiments of the present invention.

Alternatively, FIG. 2B depicts a dual sensor for the dual sensor field of view configuration shown in FIG. 1B. The dual sensor system comprises first and second emitters, 212 and 214 respectively, that are electronically communicative with the controller 204. Preferably, the first and second emitters, 212 and 214, are located at the corners of the front periphery of the automotive vehicle A.

Figure 3:
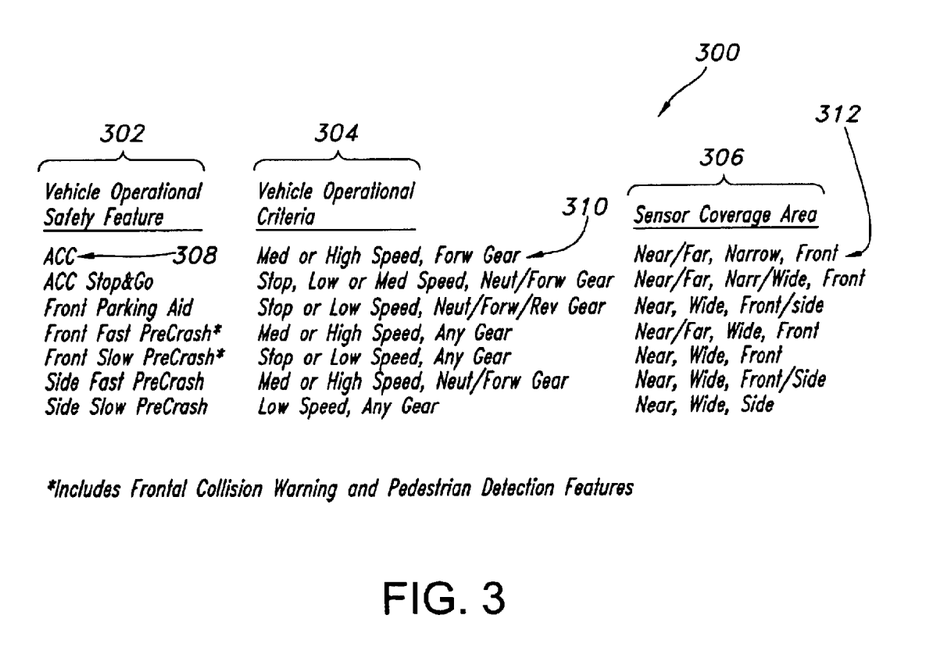
FIG. 3 illustrates a vehicle operational safety feature criteria chart according to embodiments of the present invention.

FIG. 3 illustrates a vehicle operational safety feature criteria chart according to embodiments of the present invention. The chart 300 lists the supported vehicle operational safety features 302. As illustrated, the vehicle operational safety features 302 supported by the present invention include adaptive cruise control, urban traffic adaptive cruise control, a front parking aid, front fast/slow pre-crash warning and side fast/slow pre-crash warning. Fast/slow refer to the host vehicle speed and potentially different operational feature functionality based on that speed. Additional vehicle operational safety features 302 that may be supported by the present invention include front collision mitigation by braking, side collision mitigation by braking with passenger compartment avoidance, side collision avoidance by braking, pedestrian protection, traffic situation awareness, vehicle-to-vehicle compatibility, pyrotechnic front airbag pre-arming, pyrotechnic side airbag pre-arming, pyrotechnic seatbelt pre-arming, reversible electric retractor seatbelt operation, reversible knee bolster operation and reversible seat position operation. The vehicle operational safety features 302 may either be automatically or manually activated when the vehicle operational criteria 304 for their operation is met. For manual activation, the feature must be selected by a user. Each additional vehicle operational safety feature 302 has associated vehicle operational criteria 304 and sensor coverage areas 306. The vehicle operational criteria 304 may include relative vehicle speed, gear selection or other criteria. The sensor coverage area 306 may comprise near, far, narrow, wide, frontal and side relative sensor coverage from an origination point.

Figure 4:
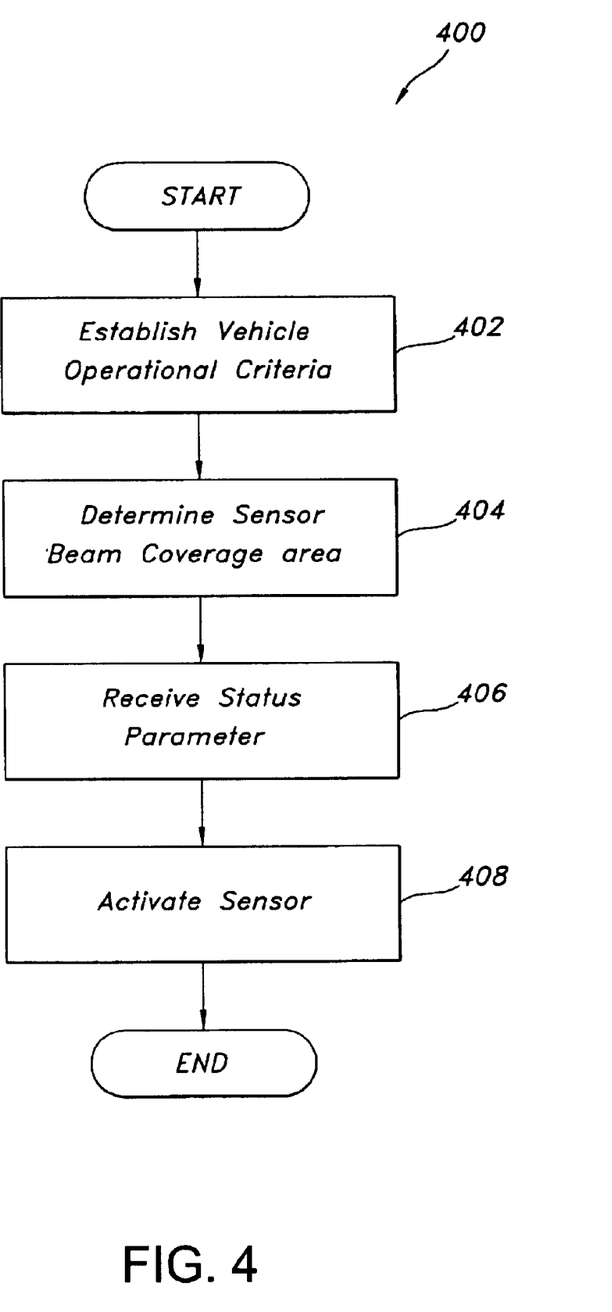
FIG. 4 is a flowchart representation for illustrating the operation of embodiments of the present invention.

FIG. 4 is a flowchart representation 400 of embodiments of the present invention. In operation, the controller 24 establishes a vehicle operational criteria 304 associated with a vehicle operational safety feature 302 as determined from the chart 300 in step 402. In step 404, the controller 24 determines a sensor beam coverage area 306 for the vehicle operational criteria 304 or the vehicle operational safety feature 302. After the controller 24 receives a status parameter representing the operational status of the vehicle in step 406, the controller 24 activates the sensor 10 for scanning the sensor beam coverage area 306 when the status parameter meets the vehicle operational criteria 304 in step 408.

For example, for the adaptive cruise control (ACC) vehicle operational feature mode 308, the ACC vehicle operational criteria 310 are predetermined to comprise medium to high speed forward motion. Next, the controller 24 determines the sensor coverage area 312 for the ACC vehicle operational criteria 310 or the ACC operational feature mode 308 when the feature is automatically selected. The sensor coverage area 312 for the vehicle operational criteria 310 or the ACC operational feature mode 308 is determined to comprise near, far, narrow and frontal relative sensor coverage; these ranges being defined relative to predetermined factors including sensor and vehicle specifications. The controller 24 then receives a status parameter representing the operational status of the vehicle. The operational status of the vehicle includes the vehicle gear selection and speed. The thresholds for low, medium or high speed are predetermined for particular applications of the present invention. Finally, the controller 24 activates the sensor 10 for ACC scanning in the near, far, narrow and frontal sensor beam coverage areas if the status parameter meets the ACC vehicle operational criteria 310, namely medium or high forward speed. If ACC is commanded by the operator, the ACC system is activated.

Figure 5:
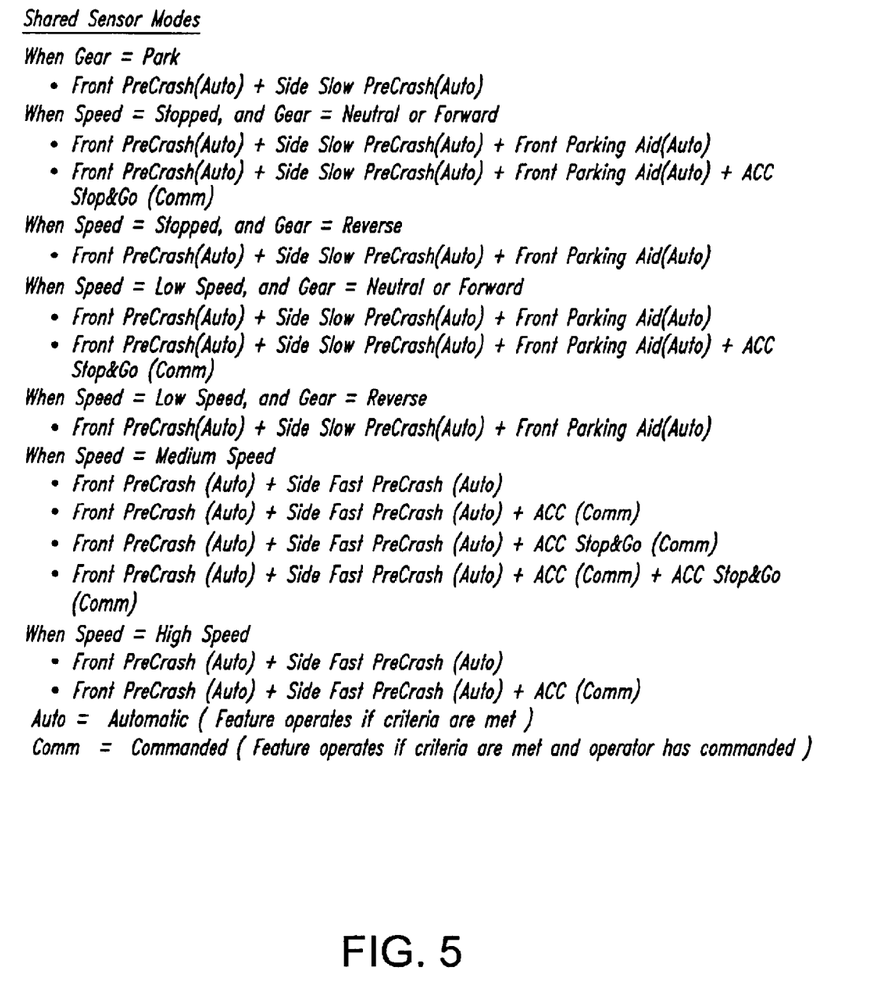
FIG. 5 illustrates a shared sensor mode chart according to embodiments of the present invention.

The vehicle operational safety features 302 of the present invention may be grouped according to shared vehicle operational criteria 304. As shown in FIG. 5, the preferred embodiment of the present invention includes both an associated front vehicle operational safety feature and a side vehicle operational safety feature for a corresponding vehicle operational criterion. As such, the front and side vehicle operational safety features 302 may operate simultaneously when the status parameter meets the vehicle operational criteria 304 for a plurality of safety features. For example, the front pre-crash and side fast pre-crash features both share a medium speed vehicle operational criterion. Therefore, when the status parameter indicates a medium speed operational status, both front and side features may be simultaneously activated. In one embodiment, these shared sensor mode features may operate on a "time-interleaved" basis. Time-interleaving for the purposes of the present invention is generally defined as sharing the overall scanning resources of the system by operating two or more vehicle operational safety modes simultaneously. Various time-interleaving techniques are well known to those skilled in the art.

The present invention has been described in relation to particular embodiments, which are intended in all respects to be illustrative rather than restrictive. Alternate embodiments will become apparent to those skilled in the art to which the present invention pertains without departing from its spirit and scope. Accordingly, the scope of the present invention is described by the appended claims and supported by the foregoing description.

What is claimed is:

1. A method of controlling a sensor in an automotive vehicle, said method comprising the steps of:

establishing a first vehicle operational criteria associated with a first vehicle operational safety feature and a second vehicle operational criteria associated with a second vehicle operational safety feature;

determining a sensor beam coverage area for said first and second vehicle operational criteria or said first and second vehicle operational safety feature;

receiving a status parameter representing the operational status of said vehicle;

activating said sensor for scanning said sensor beam coverage area when said status parameter meets said vehicle operational criteria; and simultaneously operating said first and second vehicle operational safety features.

2. The method of claim 1, wherein said sensor beam coverage area comprises front and side regions of said vehicle.

3. The method of claim 1, wherein said sensor includes a plurality of sensing beams for defining a frontal and side coverage area.

4. The method of claim 1, wherein said sensor beam coverage area comprises a 180 degree coverage area from an origination point.

5. The method of claim 1, wherein said sensor beam coverage area comprises a 270 degree coverage area from an origination point.

6. The method of claim 1, wherein said status parameter represents a gear selected by an operator.

7. The method of claim 1, wherein said status parameter represents a speed of said vehicle.

8. The method of claim 1, wherein said operational safety feature comprises one of adaptive cruise control, parking assistance, pre-crash sensing or airbag pre-arming.

9. The method of claim 1, wherein said vehicle operational safety feature is selected by an operator.

10. A method of controlling a sensor in an automotive vehicle having a plurality of frontal vehicle operational safety features and a plurality of side vehicle operational safety features to be activated depending on the presence of a remote object, said method comprising the steps of:

establishing a vehicle operational criteria associated with each of said plurality of both frontal and side vehicle operational safety features;

determining a sensor beam coverage area for each of said plurality of vehicle operational criteria or said frontal and side vehicle operational safety features, said sensor beam coverage area comprising frontal and side regions of said vehicle;

receiving a status parameter representing the operational status of said vehicle;

activating said sensor for scanning selected sensor beam coverage areas when said status parameter meets one of said vehicle operational criteria, said sensor scanning said selected sensor beam coverage areas on a time-interleaved basis; and simultaneously operating said plurality of frontal vehicle operational safety features and said plurality of side vehicle operational safety features.

11. The method of claim 10, wherein said sensor beam coverage area comprises a 180 degree coverage area from an origination point.

12. The method of claim 10, wherein said sensor beam coverage area comprises a 270 degree coverage area from an origination point.

13. The method of claim 10, wherein said status parameter represents a gear selected by an operator.

14. The method of claim 10, wherein said status parameter represents a speed of said vehicle.

15. The method of claim 10, wherein said vehicle operational safety feature comprises one of adaptive cruise control, parking assistance, pre-crash sensing or airbag pre-arming.

16. The method of claim 10, wherein said vehicle operational safety feature is selected by an operator.

17. A method of controlling a sensor in an automotive vehicle having a plurality of vehicle operational safety features to be activated depending on the presence of a remote object, said method comprising the steps of:

providing a set of vehicle operational safety features corresponding to the presence of frontal remote objects;

providing a set of vehicle operational safety features corresponding to the presence of side remote objects;

establishing a vehicle operational criteria associated with each of said plurality of frontal vehicle operational safety features;

establishing a vehicle operational criteria associated with each of said plurality of side vehicle operational safety features;

one of said frontal and one of said side vehicle operation criteria corresponding to the same vehicle operational criteria;

determining a frontal sensor beam coverage areas for each of said plurality of frontal vehicle operational criteria or frontal vehicle operational safety features;

determining a side sensor beam coverage areas for each of said plurality of side vehicle operational criteria or side vehicle operational safety features;

receiving a status parameter representing the operational status of said vehicle;

activating said sensor for scanning desired frontal and side sensor beam coverage areas when said status parameter meets one of said vehicle operational criteria; and simultaneously operating said plurality of vehicle operational safety features.

18. A sensor for sensing a front and side of an automotive vehicle, said sensor comprising:

a housing;

a plurality of beams in said housing, each of said beams associated with a frontal or side coverage area, said coverage area including far, near, wide or narrow coverage; and a controller to establish a plurality of vehicle operational criteria associated with a plurality of vehicle operational safety modes;

wherein said controller is adapted to determine said coverage area for said vehicle operational criteria and said vehicle operational safety modes, receive a status parameter corresponding to an operational status of said vehicle, and activate at least one of the beam for scanning said coverage area when said status parameter meets said vehicle operational criteria; and wherein said controller is further adapted to simultaneously operate the plurality of vehicle operational safety modes.

19. The sensor of claim 18, wherein one of said frontal or side beams is associated with the operational status of said vehicle.

* * * * *